(12) United States Patent
de la Broise

(10) Patent No.: US 9,196,140 B1
(45) Date of Patent: Nov. 24, 2015

(54) BLUETOOTH THEFT PREVENTION

(71) Applicant: Marvell International Ltd., Hamilton (BM)

(72) Inventor: Josselin de la Broise, Palo Alto, CA (US)

(73) Assignee: Marvell International Ltd., Hamilton (BM)

( * ) Notice: Subject to any disclaimer, the term of this patent is extended or adjusted under 35 U.S.C. 154(b) by 391 days.

(21) Appl. No.: 13/765,287

(22) Filed: Feb. 12, 2013

Related U.S. Application Data

(60) Provisional application No. 61/597,954, filed on Feb. 13, 2012.

(51) Int. Cl.
*H04N 13/00* (2006.01)
*G08B 13/22* (2006.01)

(52) U.S. Cl.
CPC ...................................... *G08B 13/22* (2013.01)

(58) Field of Classification Search
CPC ................................. H04N 13/04; G08B 13/22
USPC ............................... 348/51, 52, 54, 56, 55, 42
IPC ....................................................... H04N 13/00
See application file for complete search history.

(56) References Cited

U.S. PATENT DOCUMENTS

| | | | | |
|---|---|---|---|---|
| 7,664,463 | B2* | 2/2010 | Ben Ayed | 455/41.2 |
| 7,674,298 | B1* | 3/2010 | Cambridge | 726/35 |
| 2009/0207014 | A1* | 8/2009 | Ayed | 340/539.13 |
| 2010/0056055 | A1* | 3/2010 | Ketari | 455/41.3 |

* cited by examiner

*Primary Examiner* — Trang U Tran

(57) ABSTRACT

Apparatus having corresponding methods comprise: a first Bluetooth device configured to determine identities of second Bluetooth devices that are within communication range of the first Bluetooth device based on Bluetooth signals exchanged between the first Bluetooth device and the second Bluetooth devices; and a processor configured to i) determine whether the second Bluetooth devices are allowed within the communication range of the first Bluetooth device based on the identities of the second Bluetooth devices, and ii) provide an alarm indication responsive to the processor determining that any of the second Bluetooth devices are not allowed within the communication range of the first Bluetooth device. Apparatus also comprise the second Bluetooth devices.

13 Claims, 6 Drawing Sheets

BLUETOOTH THEFT PREVENTION

CROSS-REFERENCE TO RELATED APPLICATIONS

This disclosure claims the benefit of U.S. Provisional Patent Application Ser. No. 61/597,954, filed on Feb. 13, 2012, entitled "PREVENT 3DG STEALING IN CINEMA," the disclosure thereof incorporated by reference herein in its entirety.

FIELD

The present disclosure relates generally to the field of wireless communication networks. More particularly, the present disclosure relates to Bluetooth wireless communication networks.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Bluetooth wireless communication network technology has met with wide acceptance in an ever-increasing number of fields. For example, Bluetooth has recently been introduced in the field of active shutter 3D glasses for use in cinema, as well as at home. According to this technology, a cinema projector or television set controls active shutter 3D glasses using Bluetooth signals as a user views a movie or television show. In a cinema, a customer may bring his own pair of active shutter 3D glasses. Alternatively, the cinema may provide the active shutter 3D glasses to the customer. In the latter case, the user may inadvertently or purposefully remove the active shutter 3D glasses from the cinema after the movie ends, thereby causing a financial loss to the cinema.

SUMMARY

In general, in one aspect, an embodiment features an apparatus comprising: a first Bluetooth device configured to determine respectively identities of second Bluetooth devices that are within communication range of the first Bluetooth device based on Bluetooth signals exchanged between the first Bluetooth device and the second Bluetooth devices; and a processor configured to i) determine whether the second Bluetooth devices are allowed within the communication range of the first Bluetooth device based on the identities of the second Bluetooth devices, and ii) provide an alarm indication responsive to the processor determining that any of the second Bluetooth devices are not allowed within the communication range of the first Bluetooth device.

Embodiments of the apparatus can include one or more of the following features. Some embodiments comprise a memory configured to store the identities of the second Bluetooth devices that are not allowed within the communication range of the first Bluetooth device; wherein the processor is further configured to compare the identities determined by the first Bluetooth device to the identities stored in the memory. Some embodiments comprise an alarm device configured to produce an alarm responsive to the processor providing the alarm indication. Some embodiments comprise a physical object, wherein the physical object includes one of the second Bluetooth devices. In some embodiments, the physical object is a pair of active shutter 3D glasses; and the pair of active shutter 3D glasses is controlled in accordance with Bluetooth signals exchanged between one of the second Bluetooth devices and a third Bluetooth device. In some embodiments, the pair of active shutter 3D glasses further comprises: an alarm device; wherein the first Bluetooth device is further configured to transmit an alarm signal responsive to the processor providing the alarm indication; and wherein the alarm device is further configured to produce an alarm responsive to the one of the second Bluetooth devices receiving the alarm signal. In some embodiments, the identities of the second Bluetooth devices comprise at least one of: Bluetooth addresses of the second Bluetooth devices; and one or more access codes transmitted by the second Bluetooth devices. Some embodiments comprise an integrated circuit comprising the apparatus.

In general, in one aspect, an embodiment features a method comprising: respectively determining identities of second Bluetooth devices that are within communication range of a first Bluetooth device based on Bluetooth signals exchanged between the first Bluetooth device and the second Bluetooth devices; determining whether the second Bluetooth devices are allowed within the communication range of the first Bluetooth device based on the identities of the second Bluetooth devices; and providing an alarm indication responsive to determining that any of the second Bluetooth devices are not allowed within the communication range of the first Bluetooth device.

Embodiments of the method can include one or more of the following features. Some embodiments comprise storing the identities of the second Bluetooth devices that are not allowed within the communication range of the first Bluetooth device; and comparing the identities determined by the first Bluetooth device to the stored identities. Some embodiments comprise producing an alarm responsive to the alarm indication. Some embodiments comprise attaching the one of the second Bluetooth devices to a physical object. In some embodiments, the physical object is a pair of active shutter 3D glasses; and the method further comprises controlling the pair of active shutter 3D glasses in accordance with Bluetooth signals exchanged between the one of the second Bluetooth devices and a third Bluetooth device. In some embodiments, the pair of active shutter 3D glasses further comprises an alarm device; and the method further comprises i) transmitting an alarm signal from the first Bluetooth device responsive to the alarm indication, and ii) producing an alarm at the pair of active shutter 3D glasses responsive to the one of the second Bluetooth devices receiving the alarm signal. In some embodiments, the identities of the second Bluetooth devices comprise at least one of: Bluetooth addresses of the second Bluetooth devices; and one or more access codes transmitted by the second Bluetooth devices.

In general, in one aspect, an embodiment features an apparatus comprising: a Bluetooth device, wherein the Bluetooth device comprises a Bluetooth transmitter configured to transmit first Bluetooth signals, wherein the first Bluetooth signals include an identity of the Bluetooth device, and a Bluetooth receiver configured to receive second Bluetooth signals, wherein the second Bluetooth signals include i) an alarm signal, and ii) the identity of the Bluetooth device; and a processor configured to provide an alarm indication responsive to the Bluetooth device receiving the alarm signal.

Embodiments of the apparatus can include one or more of the following features. Some embodiments comprise an alarm device configured to produce an alarm responsive to the processor providing the alarm indication. Some embodiments comprise a pair of active shutter 3D glasses, wherein the pair of active shutter 3D glasses includes a left active shutter glass and a right active shutter glass; and an active shutter glass controller configured to control the left active shutter glass, and the right active shutter glass, in accordance with third Bluetooth signals received by the Bluetooth receiver. In some embodiments, the identity of the Bluetooth device comprises at least one of a Bluetooth address of the Bluetooth device; and an access code transmitted by the Bluetooth devices. Some embodiments comprise an integrated circuit comprising the apparatus.

The details of one or more implementations are set forth in the accompanying drawings and the description below. Other features will be apparent from the description and drawings, and from the claims.

Figure 1:
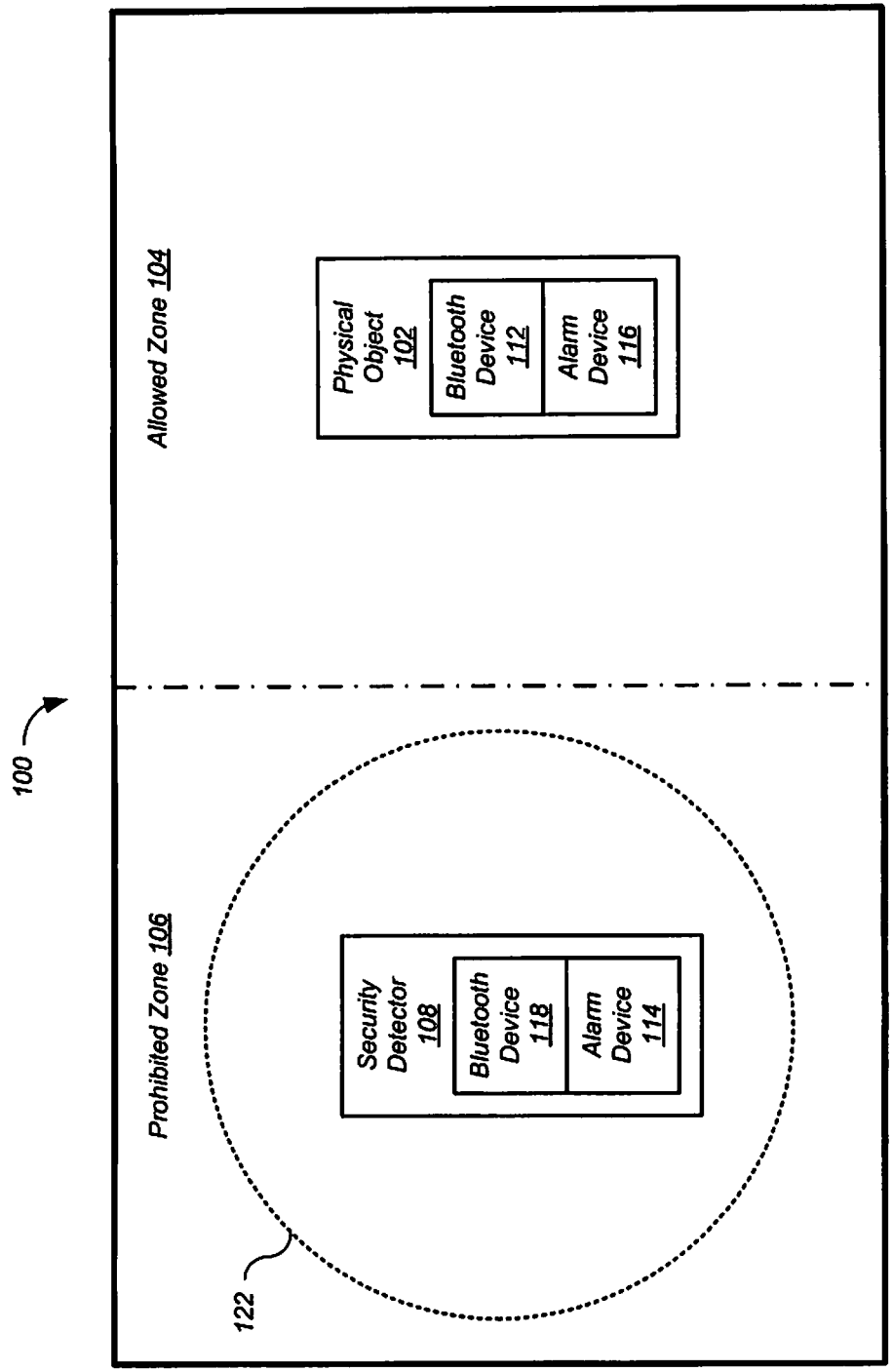
FIG. 1 illustrates a theft prevention system for preventing the theft of a physical object according to one embodiment.

The leading digit(s) of each reference numeral used in this specification indicates the number of the drawing in which the reference numeral first appears.

DETAILED DESCRIPTION

Embodiments of the present disclosure provide elements of a theft prevention system using Bluetooth signals. According to the described embodiments, a first Bluetooth device is attached to a physical object such as a pair of active shutter 3D glasses. When the physical object enters a prohibited zone, a second Bluetooth device detects the first Bluetooth device, and can trigger an alarm. The alarm can be located on the physical object, elsewhere, or both. For example, the alarm can be triggered when a cinema customer transports active shutter 3D glasses from an auditorium into a lobby.

The second Bluetooth device can identify the first Bluetooth device, for example by its Bluetooth address, in order to differentiate the prohibited physical object from other objects that are allowed in the prohibited zone. For example, active shutter 3D glasses belonging to a cinema can be prohibited in the lobby of the cinema, while active shutter 3D glasses not belonging to the cinema are allowed.

FIG. 1 illustrates a theft prevention system 100 for preventing the theft of a physical object 102 according to one embodiment. Although in the described embodiment elements of the theft prevention system 100 are presented in one arrangement, other embodiments may feature other arrangements. For example, elements of the theft prevention system 100 can be implemented in hardware, software, or combinations thereof.

Referring to FIG. 1, the theft prevention system 100 includes an allowed zone 104 where the physical object 102 is allowed, and a prohibited zone 106 where the physical object 102 is not allowed. At least one security detector 108 is located in the prohibited zone 106. The physical object 102 includes a Bluetooth device 112. Each security detector 108 includes a Bluetooth device 118.

Each security detector 108 is positioned so that the communication range 122 of its Bluetooth device 118 extends within the prohibited zone 106, but does not extend into the allowed zone 104. Therefore, security detectors 108 do not detect the physical object 102 when the physical object 102 is located in the allowed zone 104. However, when the physical object 102 enters the prohibited zone 106, a security detector 108 detects the physical object 102, and can trigger an alarm. For example, an alarm device 114 can be included in the security detector 108. As another example, the physical object 102 can include an alarm device 116. One or both of alarm devices 114, 116 can be triggered by a security detector 108 to produce an alarm, thereby alerting a bearer of the physical object 102 and/or security personnel.

Figure 2:
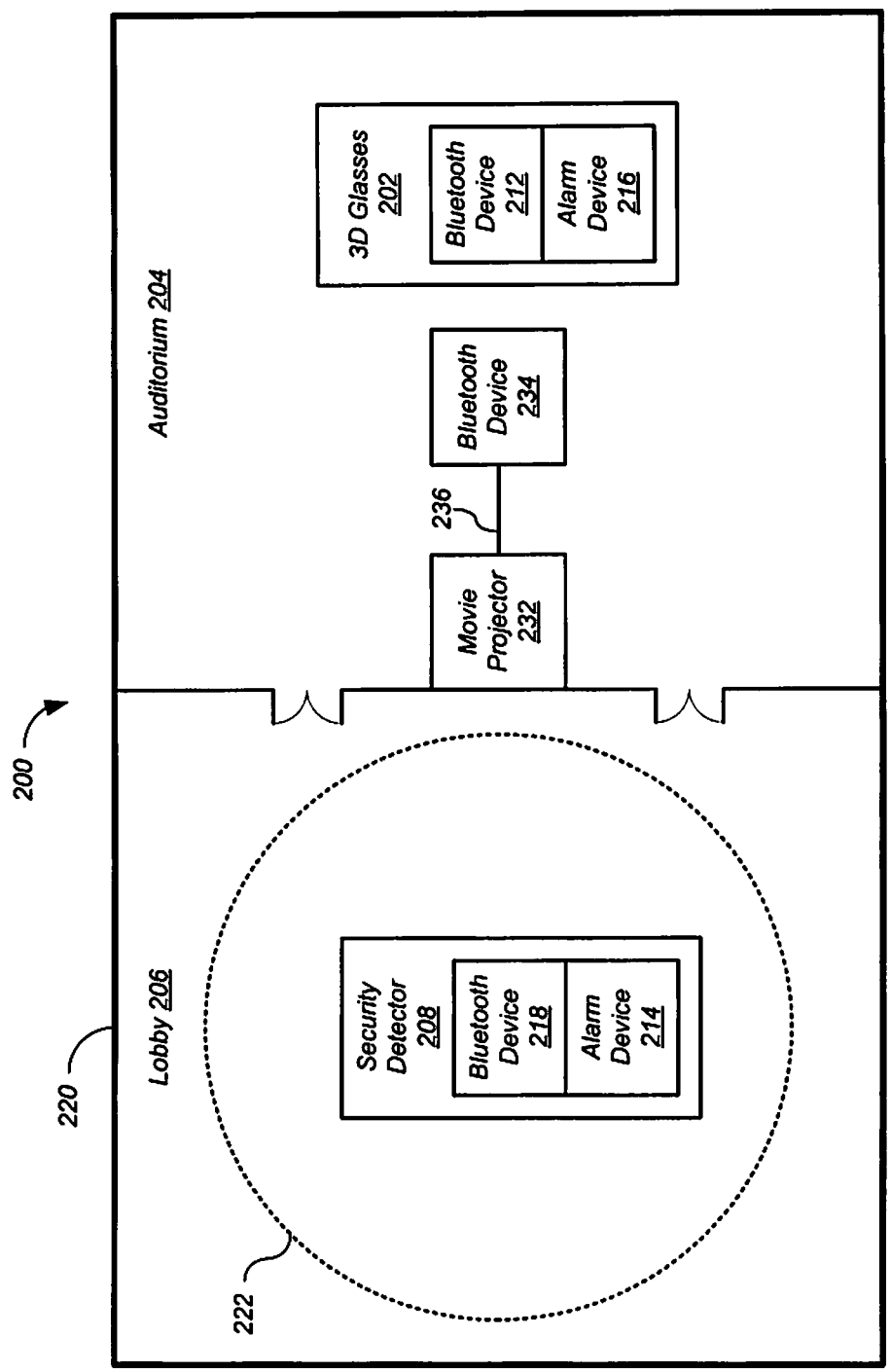
FIG. 2 illustrates a theft prevention system for preventing the theft of a pair of active shutter 3D glasses from a cinema according to one embodiment.

In some embodiments, the physical object 102 is a pair of active shutter 3D glasses. FIG. 2 illustrates a theft prevention system 200 for preventing the theft of a pair of active shutter 3D glasses 202 from a cinema 220 according to one embodiment. The cinema 220 includes an auditorium 204 where the pair of active shutter 3D glasses 202 is allowed, and a lobby 206 where the pair of active shutter 3D glasses 202 is not allowed. A projection system operates within the auditorium 204. The projection system includes a movie projector 232 configured to project movies on a projection screen, and a Bluetooth device 234 configured to control active shutter 3D glasses 202 in accordance with timing signals 236 provided by the movie projector 232. The pair of active shutter 3D glasses 202 includes a Bluetooth device 212.

At least one security detector 208 is located in the lobby 206. Each security detector 208 includes a Bluetooth device 218 and an alarm device 214. In other embodiments, the alarm device 214 can be located elsewhere in the lobby 206. Each security detector 208 is positioned so that a communication range 222 of its Bluetooth device 218 extends within the lobby 206, but does not extend into the auditorium 204. Therefore, security detectors 208 do not detect the pair of active shutter 3D glasses 202 when the pair of active shutter 3D glasses 202 is located in the auditorium 204. However, when the pair of active shutter 3D glasses 202 enters the lobby 206, a security detector 208 detects the pair of active shutter 3D glasses 202, and can trigger an alarm. For example, an alarm device 214 can be included in the security detector 208. As another example, the pair of active shutter 3D glasses 202 can include an alarm device 216. One or both of alarm devices 214, 216 can be triggered by a security detector 208 to produce an alarm, thereby alerting the bearer of the pair of active shutter 3D glasses 202 and/or security personnel.

Figure 3:
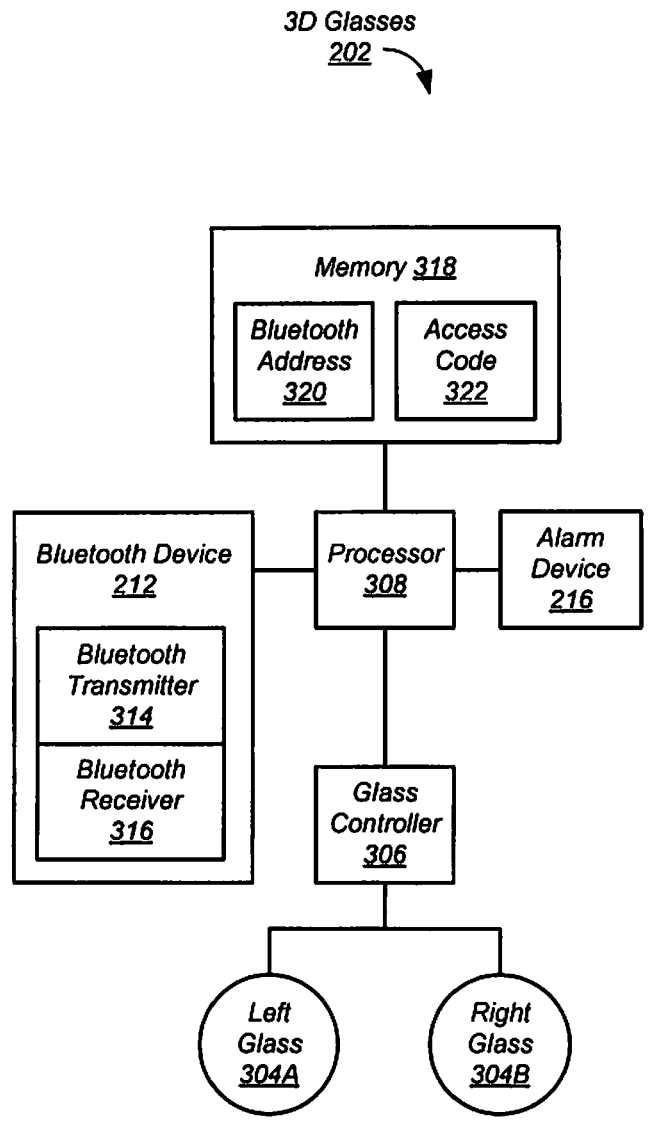
FIG. 3 shows detail of the pair of active shutter 3D glasses of FIG. 2 according to one embodiment.

FIG. 3 shows detail of the pair of active shutter 3D glasses 202 of FIG. 2 according to one embodiment. Although in the described embodiments elements of the active shutter 3D glasses 202 are presented in one arrangement, other embodiments may feature other arrangements. For example, elements of the active shutter 3D glasses 202 can be implemented in hardware, software, or combinations thereof.

Referring to FIG. 3, the pair of active shutter 3D glasses 202 includes a left active shutter glass 304A, a right active shutter glass 304B, an active shutter glass controller 306, a processor 308, an alarm device 216, a Bluetooth device 212, and a memory 318. The Bluetooth device 212 includes a Bluetooth transmitter 314 and a Bluetooth receiver 316. The memory 318 stores a Bluetooth address 320 of the Bluetooth device 212, an access code 322, and the like. The active shutter glass controller 306 and the processor 308 can be implemented together as a single controller, processor, or the like. The active shutter glass controller 306, the processor 308, the Bluetooth device 212, and the memory 318 can be implemented as one or more integrated circuits.

Figure 4:
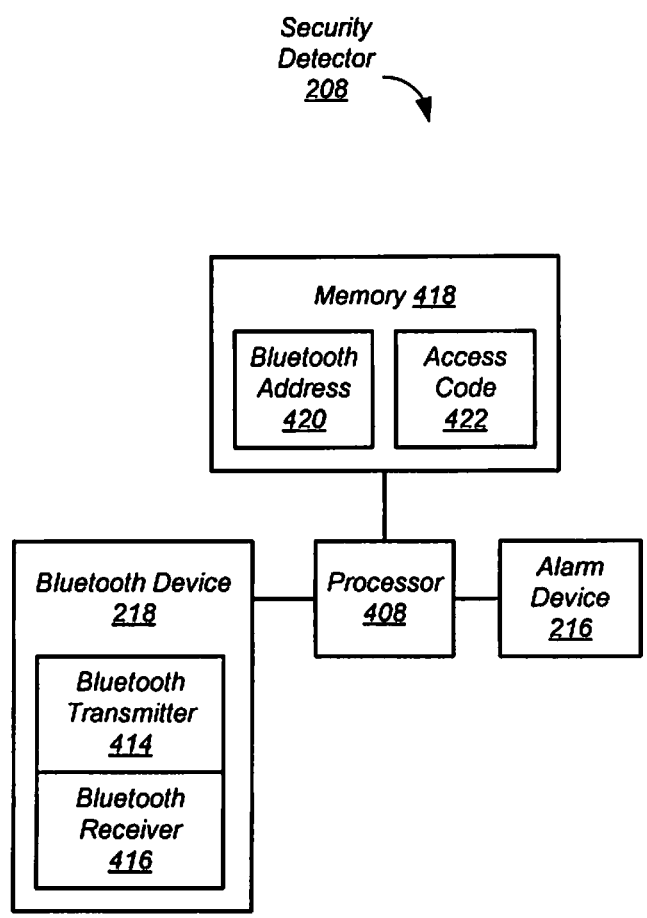
FIG. 4 shows detail of the security detector of FIG. 2 according to one embodiment.

FIG. 4 shows detail of the security detector 208 of FIG. 2 according to one embodiment. Although in the described embodiments elements of the security detector 208 are presented in one arrangement, other embodiments may feature other arrangements. For example, elements of the security detector 208 can be implemented in hardware, software, or combinations thereof.

Referring to FIG. 4, the security detector 208 includes a processor 408, an alarm device 214, a Bluetooth device 218, and a memory 418. The memory 418 stores Bluetooth addresses 420, access codes 422, and the like. The processor 408, the Bluetooth device 218, and the memory 418 can be implemented as one or more integrated circuits.

Figure 5:
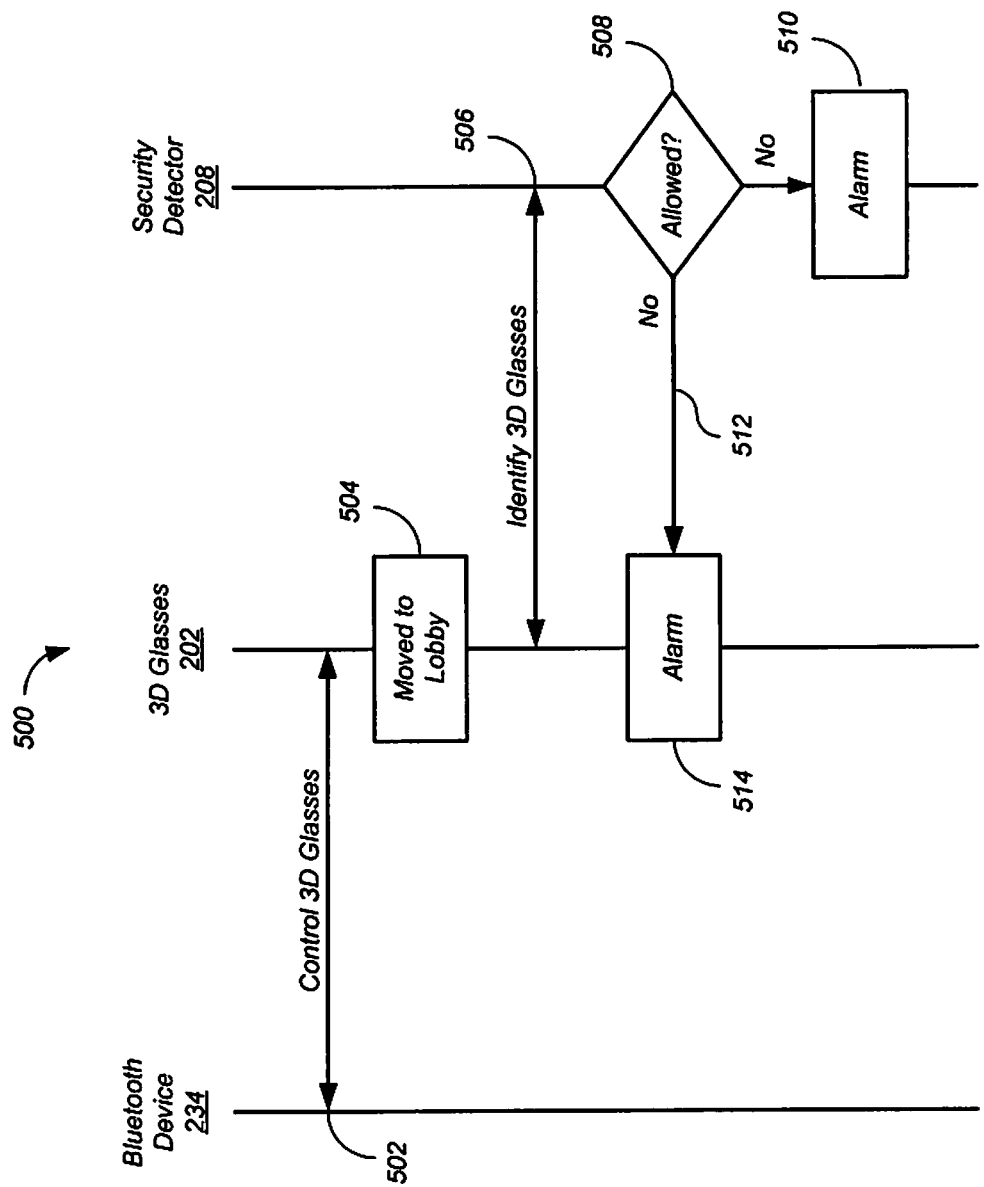
FIG. 5 shows a process for the theft prevention system of FIG. 2, according to one embodiment.

FIG. 5 shows a process 500 for the theft prevention system 200 of FIG. 2 according to one embodiment. Although in the described embodiments elements of the process 500 are presented in one arrangement, other embodiments may feature other arrangements. For example, in various embodiments, some or all of the elements of the process 500 can be executed in a different order, concurrently, and the like. Also some elements of the process 500 may not be performed, and may not be executed immediately after each other. In addition, some or all of the elements of the process 500 can be performed automatically, that is, without human intervention.

According to the process 500 the security detector 208 scans for Bluetooth devices, identifies detected Bluetooth devices, and checks the identities of the identified Bluetooth devices against the stored identities. If the identity of one of the Bluetooth devices matches one of the stored identities, then an alarm is triggered. Referring to FIG. 5, the process 500 begins with the pair of active shutter 3D glasses 202 located in the auditorium 204 of the cinema 220. At 502, the projector Bluetooth device 234 controls the pair of active shutter 3D glasses 202 in accordance with the timing signals 236 provided by the movie projector 232. In particular, the active shutter glass controller 306 controls the left active shutter glass 304A, and the right active shutter glass 304B, in accordance with the Bluetooth signals exchanged between the Bluetooth device 212 in the pair of active shutter 3D glasses 202 and the Bluetooth device 234 in the movie projection system.

In some embodiments, each active shutter glass 304 includes a transparent liquid crystal layer that becomes opaque when a voltage is applied by the active shutter glass controller 306. When controlled in accordance with the projector timing signals 236, the pair of active shutter 3D glasses 202 can present different images to the wearer's left and right eyes, thereby creating a 3D effect or the like.

At 504, the pair of active shutter 3D glasses 202 are moved from the auditorium 204 of the cinema 220 to the lobby 206. At 506, when the pair of active shutter 3D glasses 202 enters the communication range 222 of the security detector 208, the security detector 208 identifies the pair of active shutter 3D glasses 202. In particular, the identification process employs the transmission of Bluetooth signals between the Bluetooth device 212 in the pair of active shutter 3D glasses 202 and the Bluetooth device 218 in the security detector 208.

At 508, the security detector 208 determines whether the Bluetooth device 212 is allowed within the communication range 222 of the Bluetooth device 218 of the security detector 208. This determination is based on the identity of the Bluetooth device 212. If the security detector 208 determines that the Bluetooth device 212 is not allowed within the communication range 222 of the Bluetooth device 218 of the security detector 208, one or more alarms may be triggered. In particular, the processor 408 of the security detector 208 provides an alarm indication.

In one embodiment, at 510, responsive to the alarm indication, the security detector 208 produces an alarm. In particular, the processor 408 provides an alarm signal 402 to the alarm device 214 in the security detector 208. Responsive to the alarm signal 402, the alarm device 214 produces an alarm. In another embodiment, the security detector 208 causes the pair of active shutter 3D glasses 202 to produce an alarm. In particular, at 512, the Bluetooth device 218 in the security detector 208 transmits an alarm signal to the Bluetooth device 212 in the pair of active shutter 3D glasses 202. The alarm signal can include the identity of the Bluetooth device 212. At 514, responsive to receiving the alarm signal, the processor 308 in the pair of active shutter 3D glasses 202 causes the alarm device 216 in the pair of active shutter 3D glasses 202 to produce an alarm.

This identification process employed by the security detector 208 to identify the pair of active shutter 3D glasses 202 can be implemented in any manner. In one embodiment, a conventional Bluetooth discovery process is employed. In particular, the Bluetooth device 212 of the security detector 208 transmits one or more Bluetooth inquiry messages. Responsive to receiving a Bluetooth inquiry message, the Bluetooth device 218 of the pair of active shutter 3D glasses 202 transmits an inquiry response message. The inquiry response message includes the Bluetooth address 320 of the Bluetooth device 218 of the pair of active shutter 3D glasses 202. In some embodiments, a dedicated inquiry is used based on class of device.

In other embodiments, an enhanced Bluetooth discovery process is employed. For example, a small set of Bluetooth channels can be used during an inquiry process for faster detection, and to save power in the pair of active shutter 3D glasses 202. The channel map employed can be transmitted to the pair of active shutter 3D glasses 202 by the Bluetooth device 234 in the auditorium 204. As another example, the inquiry messages, and the inquiry response messages, can be transmitted on different Bluetooth channels. As another example, an access code 322 stored in the memory 318 of the pair of active shutter 3D glasses 202 can be used instead of the Bluetooth address 320. The access code 322 can be included in a header of the inquiry response message, for example. The access code 322 may be common to multiple pairs of active shutter 3D glasses 202 used by the cinema 220.

In other embodiments, a broadcast Bluetooth discovery process is employed. According to this approach, the Bluetooth device 212 of the pair of active shutter 3D glasses 202 transmits broadcast Bluetooth signals that include the Bluetooth address 320 of the Bluetooth device 212 or the access code 322. In some embodiments, the broadcast Bluetooth signals are Bluetooth low energy (BLE) signals. The security detector 208 advertises its services, and the pair of active shutter 3D glasses 202 scans and replies with data specific to those services. In all of these identification approaches, the security detector 208 receives the Bluetooth address 320 of the Bluetooth device 212 in the pair of active shutter 3D glasses 202, the access code 322 stored in the memory 318 of the pair of active shutter 3D glasses 202, or the like.

Figure 6:
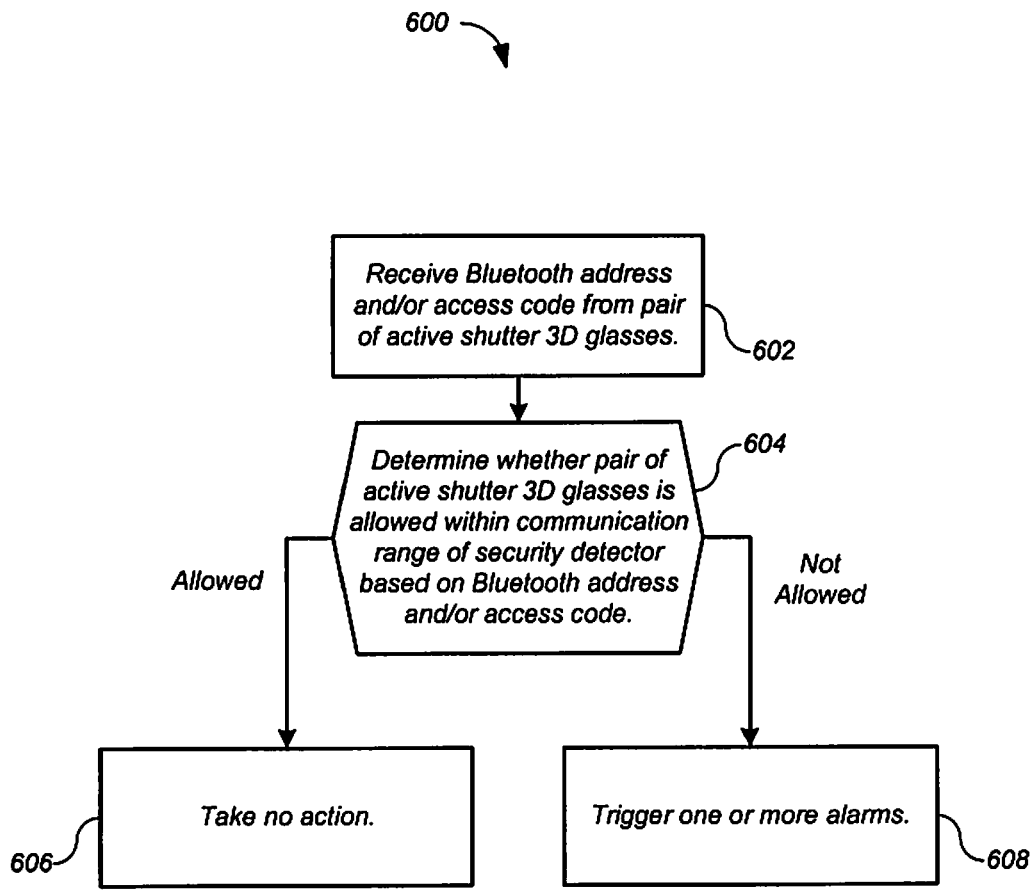
FIG. 6 shows an identification process for the theft prevention system of FIG. 2 according to one embodiment.

FIG. 6 shows an identification process 600 for the theft prevention system 200 of FIG. 2 according to one embodiment. Although in the described embodiments elements of the process 600 are presented in one arrangement, other embodiments may feature other arrangements. For example, in various embodiments, some or all of the elements of the process 600 can be executed in a different order, concurrently, and the like. Also some elements of the process 600 may not be performed, and may not be executed immediately after each other. In addition, some or all of the elements of the process 600 can be performed automatically, that is, without human intervention.

Referring to FIG. 6, at 602, the security detector 208 receives, from the pair of active shutter 3D glasses 202, the Bluetooth address 320 of the Bluetooth device 212, and/or the access code 322 stored in the memory 318, of the pair of active shutter 3D glasses 202. At 604, the security detector 208 determines whether the Bluetooth device 212 is allowed within the communication range 222 of the security detector 208 based on the received Bluetooth address 320 and/or access code 322. In particular, the processor 408 of the security detector 208 compares the received Bluetooth address 320 to the Bluetooth addresses 420 stored in its memory 418. In embodiments that employ access codes 322 that are specific to this use case, the Bluetooth receiver 316 of the security detector 208 correlates against this access code 322.

If the specific access code 322 is not detected, or if the received Bluetooth address 320 does not appear in the memory 418, then the Bluetooth device is allowed in the lobby 206 of the cinema 220. For example, the Bluetooth device may be part of a pair of active shutter 3D glasses 202 belonging to a customer, or may be part of a different type of Bluetooth device such as a smartphone or wireless headset. In this case, at 606, no action is taken.

Alternatively, if the specific access code 322 is detected, or if the received Bluetooth address 320 appears in the memory 418, then the detected Bluetooth device is part of a pair of active shutter 3D glasses 202 that belong to the cinema 220, and so are not allowed in the lobby of the cinema 220. In this case, at 608, one or more alarms may be triggered, for example as described above.

Various embodiments of the present disclosure can be implemented in digital electronic circuitry, or in computer hardware, firmware, software, or in combinations thereof. Embodiments of the present disclosure can be implemented in a computer program product tangibly embodied in a computer-readable storage device for execution by a programmable processor. The described processes can be performed by a programmable processor executing a program of instructions to perform functions by operating on input data and generating output. Embodiments of the present disclosure can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, processors receive instructions and data from a read-only memory and/or a random access memory. Generally, a computer includes one or more mass storage devices for storing data files. Such devices include magnetic disks, such as internal hard disks and removable disks, magneto-optical disks; optical disks, and solid-state disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations have been described. Nevertheless, various modifications may be made without departing from the scope of the disclosure. Accordingly, other implementations are within the scope of the following claims.

What is claimed is:

1. A first network device comprising:
   a first Bluetooth device configured to determine respectively identities of second Bluetooth devices within a communication range of the first Bluetooth device based on first Bluetooth signals exchanged between the first Bluetooth device and the second Bluetooth devices, wherein the second Bluetooth devices are implemented respectively in second network devices, and wherein the second network devices are separate from the first network device; and
   a processor configured to
   i) determine whether the second Bluetooth devices are allowed within the communication range of the first Bluetooth device based on the identities of the second Bluetooth devices,
   ii) detect one or more of the second Bluetooth devices within the communication range of the first Bluetooth device, and
   iii) provide an alarm indication responsive to the processor a) detecting the one or more of the second Bluetooth devices within the communication range of the first Bluetooth device, and b) determining the one or more of the second Bluetooth devices are not allowed within the communication range of the first Bluetooth device, wherein
   the second Bluetooth devices are within the communication range of the first Bluetooth device when the second Bluetooth devices are within a same room as the first Bluetooth device,
   the second Bluetooth devices are out of the communication range of the first Bluetooth device when the second Bluetooth devices are in a different room than the first Bluetooth device,
   the second network devices comprise respective pairs of active shutter 3D glasses,
   the pairs of active shutter 3D glasses are controlled in accordance with second Bluetooth signals exchanged between the second Bluetooth devices and a third Bluetooth device,
   the third Bluetooth device is implemented in a third network device separate from the first network device and the second network devices,
   the third network device is in a second room, and
   the processor is configured to generate the alarm indication when one of the second Bluetooth devices moves from the second room in which the third Bluetooth device is located to the room in which the first Bluetooth device is located.

2. The first network device of claim 1, further comprising:
   a memory configured to store the identities of the second Bluetooth devices that are not allowed within the communication range of the first Bluetooth device; and
   wherein the processor is further configured to (i) compare the identities determined by the first Bluetooth device to the identities stored in the memory, and (ii) provide the alarm indication if any one of the identities determined by the first Bluetooth device matches any one of the identities stored in the memory.

3. The first network device of claim 1, further comprising an alarm device configured to produce an alarm responsive to the processor providing the alarm indication.

4. The first network device of claim 1, wherein the identities of the second Bluetooth devices comprise:
   Bluetooth addresses of the second Bluetooth devices; and
   one or more access codes transmitted by the second Bluetooth devices.

5. The first network device of claim 2, wherein the processor is configured to refrain from generating an alarm indication for one of the second network devices if the identity of the one of the second network devices is determined by the first Bluetooth device to not match any of the identities stored in the memory.

6. A system comprising:
   the first network device of claim 1; and
   the second network devices.

7. The first network device of claim 6, wherein:
   the second network devices comprise respective alarm devices;
   the first Bluetooth device is further configured to, responsive to the processor providing the alarm indication, transmit an alarm signal to the one or more of the second Bluetooth devices;
   the one or more of the second Bluetooth devices are within range of the first Bluetooth device; and
   each of the alarm devices of the second network devices corresponding to the one or more of the second Bluetooth devices is configured to, responsive to the alarm signal, produce an alarm indication.

8. The system of claim 6, wherein:
   the third network device is a movie projector and generates timing signals;
   the second network devices each comprise respective glass controllers; and
   each of the glass controllers controls a corresponding one of the pairs of active shutter glasses based on the timing signals.

9. A method of operating a first network device, wherein the first network device comprises a first Bluetooth device, the method comprising:
   respectively determining identities of second Bluetooth devices within a communication range of the first Bluetooth device based on Bluetooth signals exchanged between the first Bluetooth device and the second Bluetooth devices, wherein the second Bluetooth devices are implemented respectively in second network devices, and wherein the second network devices are separate from the first network device;
   determining whether the second Bluetooth devices are allowed within the communication range of the first Bluetooth device based on the identities of the second Bluetooth devices;
   detect one or more of the second Bluetooth devices within the communication range of the first Bluetooth device;
   providing an alarm indication responsive to a) detecting the one or more of the second Bluetooth devices within the communication range of the first Bluetooth device, and b) determining the one or more of the second Bluetooth devices are not allowed within the communication range of the first Bluetooth device, wherein
   the second Bluetooth devices are within the communication range of the first Bluetooth device when the second Bluetooth devices are within a same room as the first Bluetooth device,
   the second Bluetooth devices are out of the communication range of the first Bluetooth device when the second Bluetooth devices are in a different room than the first Bluetooth device, and
   the second network devices comprise respective pairs of active shutter 3D glasses;
   controlling the pairs of active shutter 3D glasses in accordance with second Bluetooth signals exchanged between the second Bluetooth devices and a third Bluetooth device, wherein the third Bluetooth device is implemented in a third network device separate from the first network device and the second network devices, wherein the third network device is in a second room; and
   generating the alarm indication when one of the second Bluetooth devices moves from the second room in which the third Bluetooth device is located to the room in which the first Bluetooth device is located.

10. The method of claim 9, further comprising:
    storing the identities of the second Bluetooth devices that are not allowed within the communication range of the first Bluetooth device;
    comparing the identities determined by the first Bluetooth device to the stored identities; and
    providing the alarm indication if any one of the identities determined by the first Bluetooth device matches any one of the stored identities.

11. The method of claim 10, further comprising:
    i) responsive to the alarm indication, transmitting an alarm signal from the first Bluetooth device to the one or more of the second Bluetooth devices, wherein the one or more of the second Bluetooth devices is within range of the first Bluetooth device, and
    ii) responsive to the alarm signal, producing an alarm indication at each of the second network devices corresponding to the one of the second Bluetooth devices.

12. The method of claim 9, wherein the identities of the second Bluetooth devices comprise:
    Bluetooth addresses of the second Bluetooth devices; and
    one or more access codes transmitted by the second Bluetooth devices.

13. A first network device comprising:
    a first Bluetooth device configured to determine respectively identities of second Bluetooth devices within a communication range of the first Bluetooth device based on first Bluetooth signals exchanged between the first Bluetooth device and the second Bluetooth devices, wherein the second Bluetooth devices are implemented respectively in second network devices, and wherein the second network devices are separate from the first network device; and
    a processor configured to
    i) determine whether the second Bluetooth devices are allowed within the communication range of the first Bluetooth device based on the identities of the second Bluetooth devices, and
    ii) provide an alarm indication responsive to the processor determining that any of the second Bluetooth devices are not allowed within the communication range of the first Bluetooth device,
    wherein
      the second Bluetooth devices are within the communication range of the first Bluetooth device when the second Bluetooth devices are within a same room as the first Bluetooth device;

the second Bluetooth devices are out of the communication range of the first Bluetooth device when the second Bluetooth devices are in a different room than the first Bluetooth device, the second network devices comprise respective pairs of active shutter 3D glasses, the pairs of active shutter 3D glasses are controlled in accordance with second Bluetooth signals exchanged between the second Bluetooth devices and a third Bluetooth device, the third Bluetooth device is implemented in a third network device separate from the first network device and the second network devices, the third network device is in a second room, and the processor is configured to generate the alarm indication when one of the second Bluetooth devices moves from the second room in which the third Bluetooth device is located to the room in which the first Bluetooth device is located.

* * * * *